United States Patent
Haber et al.

(10) Patent No.: US 9,532,590 B2
(45) Date of Patent: Jan. 3, 2017

(54) COOLING TRAY

(71) Applicant: D.W. HABER & SON, INC., Bronx, NY (US)

(72) Inventors: David Haber, Armonk, NY (US); David Conroy, Brooklyn, NY (US); Elena Losik Damm, Brooklyn, NY (US)

(73) Assignee: D.W. Haber & Son, Inc., Bronx, NY (US)

( * ) Notice: Subject to any disclaimer, the term of this patent is extended or adjusted under 35 U.S.C. 154(b) by 278 days.

(21) Appl. No.: 14/277,036

(22) Filed: May 13, 2014

(65) Prior Publication Data

US 2014/0338859 A1  Nov. 20, 2014

Related U.S. Application Data

(60) Provisional application No. 61/823,464, filed on May 15, 2013.

(51) Int. Cl.
*F25D 3/08* (2006.01)
*A23L 3/36* (2006.01)

(52) U.S. Cl.
CPC . *A23L 3/36* (2013.01); *F25D 3/08* (2013.01); *F25D 2303/081* (2013.01); *F25D 2303/0845* (2013.01); *F25D 2331/812* (2013.01)

(58) Field of Classification Search
CPC ............... F25D 2303/081; F25D 2303/0845; F25D 2331/812; F25D 3/08; F25D 3/00; F25D 2303/08221; F25D 21/14; A23L 3/36; A23L 3/362; A23L 3/361

USPC ............... 62/457.6, 457.2; 165/67
See application file for complete search history.

(56) References Cited

U.S. PATENT DOCUMENTS

| | | | |
|---|---|---|---|
| 3,724,715 A | 4/1973 | Auriemma | |
| 4,505,132 A | 3/1985 | Howes et al. | |
| 4,920,763 A | 5/1990 | Provest et al. | |
| 5,564,288 A | 10/1996 | Lewis | |
| 5,596,880 A | 1/1997 | Welker et al. | |
| 5,813,569 A | 9/1998 | Cihanek | |
| 5,845,515 A * | 12/1998 | Nelson ................... | A45C 11/20 62/457.7 |
| 5,910,162 A | 6/1999 | Harbour et al. | |

(Continued)

FOREIGN PATENT DOCUMENTS

GB          1537821 A       1/1979

*Primary Examiner* — Len Tran
*Assistant Examiner* — Ana Vasquez
(74) *Attorney, Agent, or Firm* — North Shore Patents, P.C.; Michele Liu Baillie

(57) ABSTRACT

A cooling tray includes a container, springs placed within the container to exerting a vertical thrust, a platform residing within the container and coupled to each spring, and a bowl for residing above the container. When ice is placed on the platform, the plurality of springs are each compressed such that the cooling material contacts an undersurface of the bowl. As the ice melts, the water flows below the platform, and the springs decompress and maintain the remaining ice in contact with the undersurface of the bowl. In this manner, food that requires refrigeration may be served from the portable cooling tray at the appropriate temperature. A formed ice block may be used to impart greater and more efficient cooling as a greater surface area of the ice contacts the undersurface of the bowl. The bowl may be of aluminum to further increase the efficiency.

7 Claims, 25 Drawing Sheets

(56) References Cited

U.S. PATENT DOCUMENTS

| | | |
|---|---|---|
| 7,246,784 B1 | 7/2007 | Lopez |
| 7,717,318 B2 | 5/2010 | Brand |
| 2008/0047296 A1* | 2/2008 | Helmer .................... F25D 3/08 62/457.7 |
| 2008/0087037 A1 | 4/2008 | Rapaz |
| 2010/0147014 A1 | 6/2010 | Kim |

* cited by examiner

COOLING TRAY

CROSS-REFERENCE TO RELATED APPLICATIONS

The present application claims priority to U.S. provisional patent application Ser. No. 61/823,464, filed on May 15, 2013.

BACKGROUND OF THE INVENTION

In the food service industry, storing food at the proper temperature is important for food safety. For example, U.S. Food and Drug Administration regulations require refrigerated food to be stored at 40° F. or below. This requirement applies when the food is being served as well. Often, the food service is to be portable, such as for the catering of events. However, existing portable devices for serving refrigerated food is inadequate for maintaining the food at the required 40° F. or below. These existing portable devices either are not able to lower the temperature of the food to the required temperature or are unable to maintain the temperature consistently. Often, food servers either opt to not serve food that requires refrigeration, place food plates directly onto a bed of ice, or use bulky, expensive and/or non-portable devices that require electricity.

BRIEF SUMMARY OF THE INVENTION

According to one embodiment of the present invention, a cooling tray includes: a container; a plurality of springs placed within the container to exert an upward thrust and each coupled to the container at a first end; a platform residing within the container and coupled to each spring at a second end; and a bowl for residing above the container. When a cooling material is placed on the platform, each of the plurality of springs are compressed such that the cooling material contacts the undersurface of the bowl.

In one aspect of the present invention, as the cooling material melts, the melted cooling material flows below the platform, and the plurality of springs each decompresses and maintains the remaining cooling material in contact with the undersurface of the bowl.

In one aspect of the present invention, the cooling material is a formed ice block with a shape and size to fit onto the platform and within the container.

In one aspect of the present invention, the cooling tray further includes a locking mechanism that includes: a hook coupled to an undersurface of the platform; a bracket coupled to the container, and a release lever coupled to the hook. The hook engages the bracket to place the platform in a locked position. Engagement of the release lever disengaged the hook from the bracket, placing the platform in an unlocked position.

In one aspect of the present invention, the cooling tray further includes a skirt coupled to inside walls of the container and a plurality of latch assemblies coupled to inside walls of the container and residing within the plurality of slots. The skirt surrounds the platform and is not coupled to the platform. The skirt includes a plurality of slots in one or more vertical walls of the skirt. The skirt is moveable in a vertical direction along the latch assemblies residing in the slots.

In one aspect of the present invention, while the skirt is in an up position, an upper lip of the skirt is beyond the upper lip of the container. While the skirt is in a down position, the upper lip of the skirt is flush with the upper lip of the container.

In one aspect of the present invention, the inside walls of the container further includes a bump, and the skirt further includes an angled portion. When the angled portion of the skirt engages the bump, the skirt is maintained at an up position.

DETAILED DESCRIPTION OF THE INVENTION

The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments.

Thus, the present invention is not intended to be limited to the embodiment shown but is to be accorded the widest scope consistent with the principles and features described herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

FIGS. 1-13 illustrate a first embodiment of a cooling tray according to the present invention.

Figure 1:
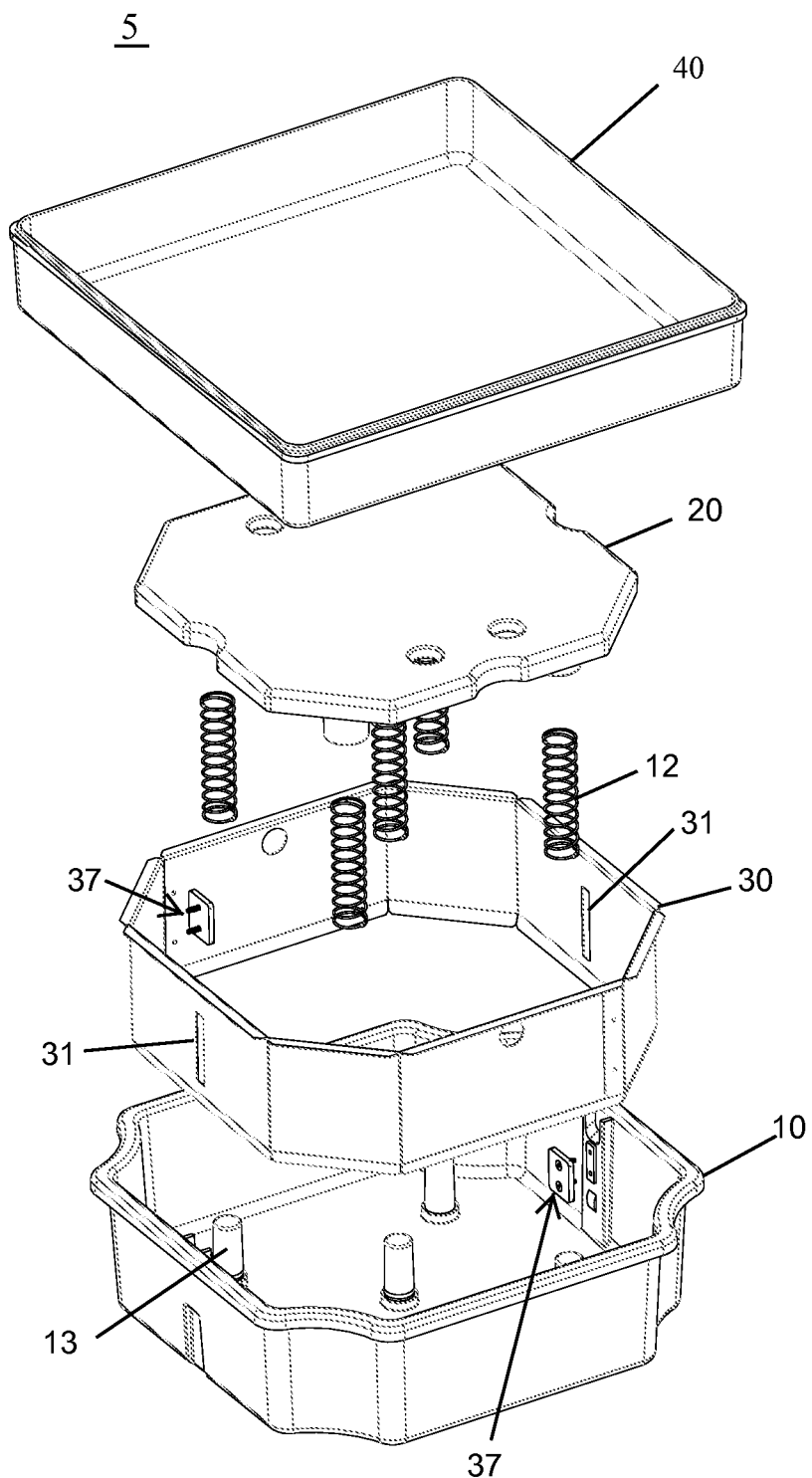
FIG. 1 illustrates an exploded view of a cooling tray according to a first embodiment of the present invention.

FIG. 1 illustrates an exploded view of a cooling tray according to a first embodiment of the present invention. The cooling tray 5 comprises a container 10, a platform 20, a skirt 30, and a bowl 40 with sidewalls. A plurality of springs 12 are placed upon a plurality of pegs 13 coupled to the container 10 to exert an upward thrust. The platform 20 is not coupled to the skirt 30. Instead, the platform 20 engages the springs 12 and "floats" within the container 10 independently of the skirt 30. A cooling material, such as ice (not shown), may be placed on top of the platform 20, where the weight of the ice compresses the springs 12, lowering the platform 20. The bowl 40 is above the container 10 and on the ice, with the bowl's undersurface contacting the ice which cools the bowl 40. Food placed within the bowl 40 is also cooled, with the sidewalls and an optional lid (not shown) of the bowl 40 assisting in maintaining the food cool. No food is placed in the container 10 or in the ice. As the ice melts, and the water flows below the platform 20 around the side edges of the platform 20. The weight of the ice decreases and decompresses the springs 12, keeping the ice in contact with the undersurface of the bowl 40. In this embodiment, the bowl 40 is composed of aluminum, which optionally may have a coating for increased durability of the bowl 40 and food safety. However, other materials and/or coatings may be used without departing from the spirit and scope of the present invention. The skirt 30 surrounds the platform 20 and is coupled to the inside wall of the container 10 via a plurality of latch assemblies 37. The plurality of latch assemblies 37 reside within a plurality of slots 31 in the vertical walls of the skirt 30. The skirt 30 is movable along the latch assemblies 37 in the slots 31 in a vertical direction. In this embodiment, the cooling tray 5 includes two latch assemblies 37 located at opposite walls of the container 10, however, any number of and locations for latch assemblies may be used.

Figure 2:
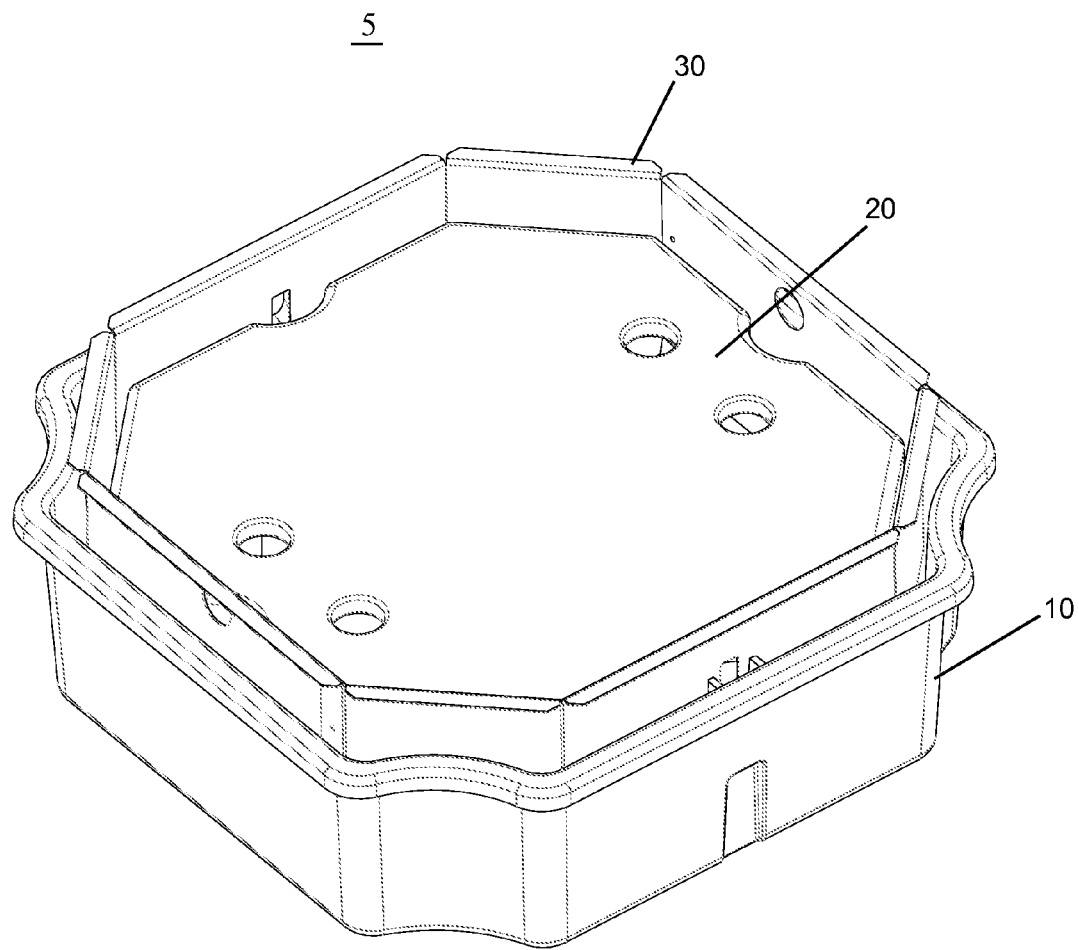
FIGS. 2 and 3 illustrate isometric views of the cooling tray with the skirt in the up and down positions according to the first embodiment of the present invention.
Figure 3:
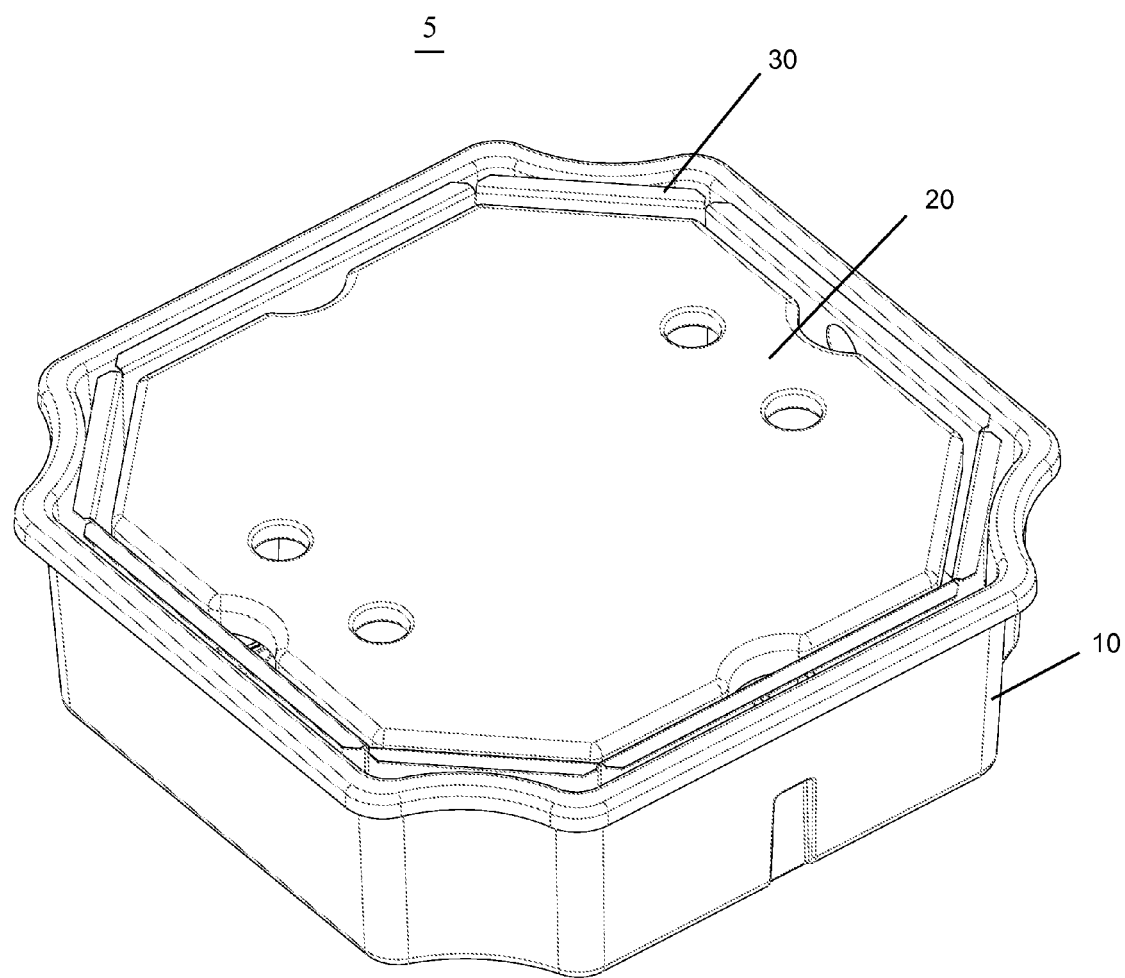

The skirt 30 may be placed in an "up" position or "down" position while attached to the container 10. FIG. 2 illustrates an isometric view of the cooling tray 5 with the skirt in the up position, while FIG. 3 illustrates an isometric view of the cooling tray 5 with the skirt 30 in the down position. In the up position (FIG. 2), the skirt 30 functions as a temporary retaining wall. A user may then load ice onto the platform 20, using the skirt 30 as a reference on how much ice to load. As the ice is loaded, the spring-loaded platform 20 drops into the container 10 from the weight of the ice. Once the ice is loaded, the skirt 30 is moved to the down position. When the skirt 30 is in the down position (FIG. 3), the lip of the skirt 30 is flush with the upper lip of the container 10, preventing the skirt from being an obstacle for the bowl 40. The bowl 40 can then positioned on the ice.

Figure 4:
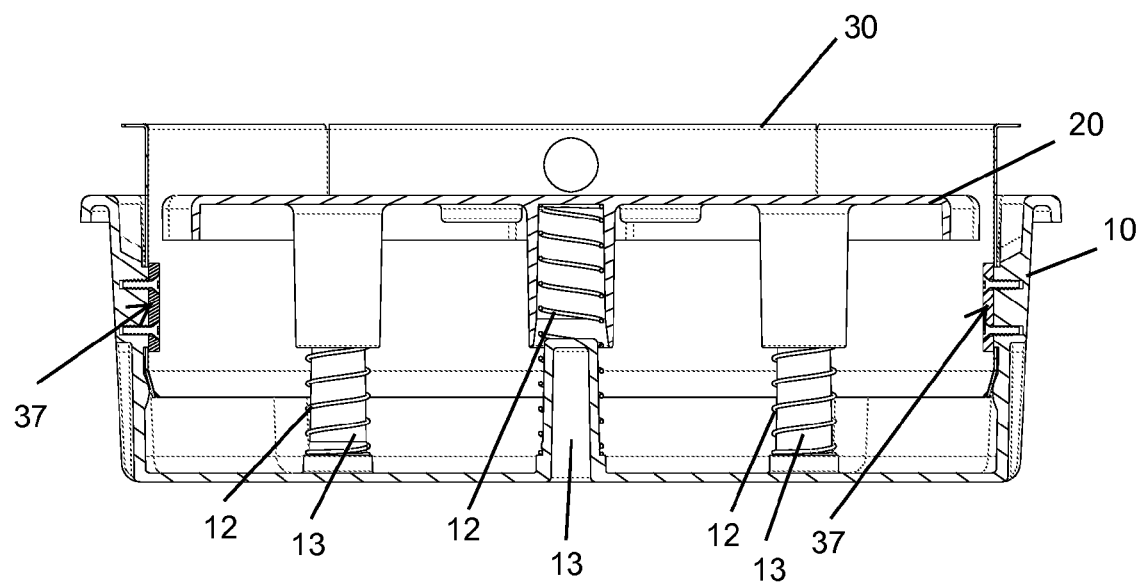
FIGS. 4 and 5 illustrate cross-sectional views of the cooling tray according to a first embodiment of the present invention.
Figure 5:
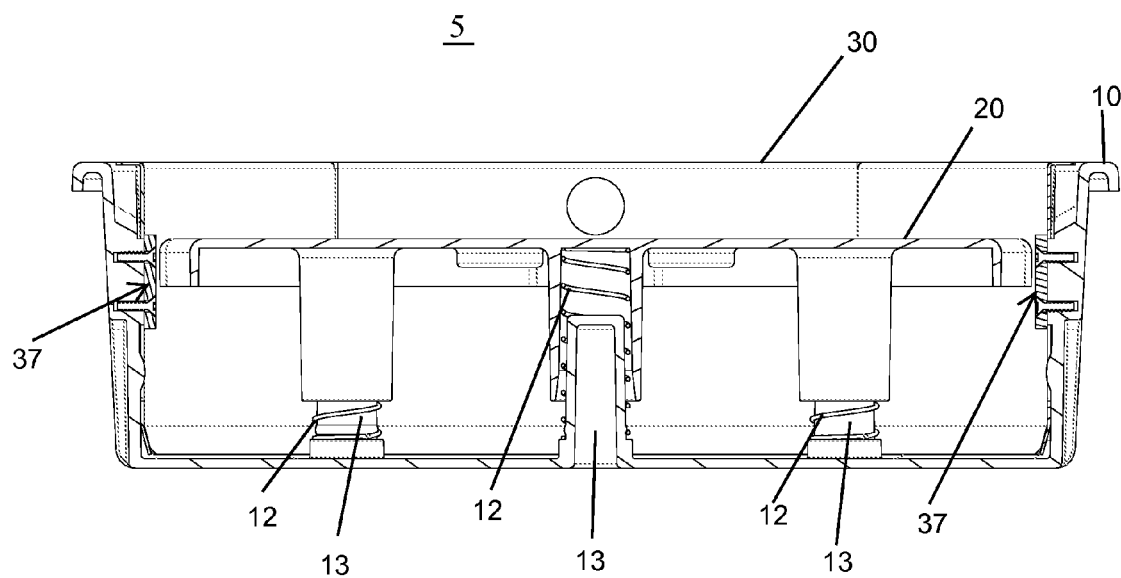

FIGS. 4 and 5 illustrate cross-sectional views of the cooling tray according to a first embodiment of the present invention. FIG. 4 illustrates the cooling tray 5 with the platform 20 and the skirt 30 in the up position. The springs 12 residing on the pegs 13 are each decompressed. The skirt 30 is coupled to the container 10 via the latch assemblies 37. With the platform 20 and the skirt 30 in the up position, ice (not shown) may then be loaded onto the platform 20. FIG. 5 illustrates the cooling tray 5 with the platform 20 and the skirt 30 in the down position. The weight of the ice compressed the springs 12, which moves the platform 20 toward the down position. Upon completion of the loading of the ice, the skirt 30 may be moved to the down position, as described further below.

Figure 6:
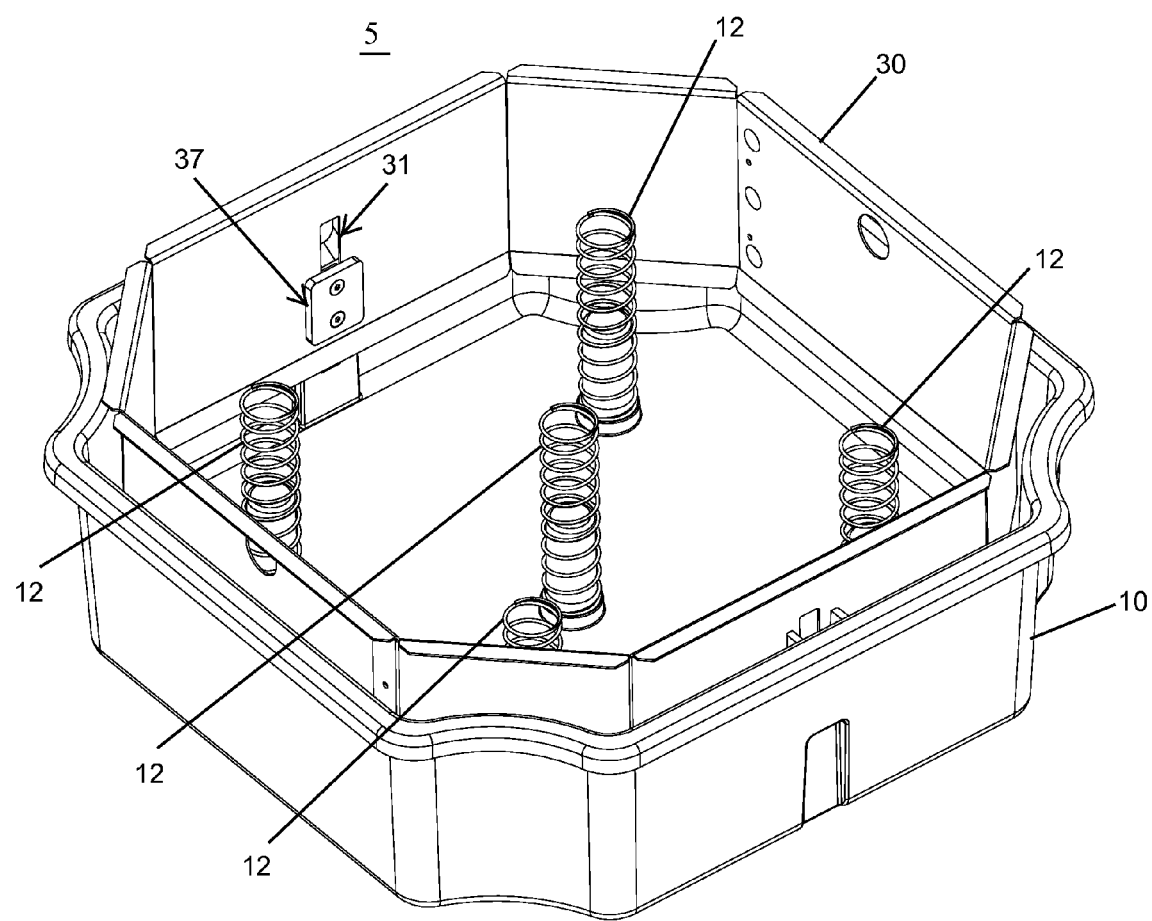
FIGS. 6 and 7 illustrate isometric views of the cooling tray without the platform according to a first embodiment of the present invention.
Figure 7:
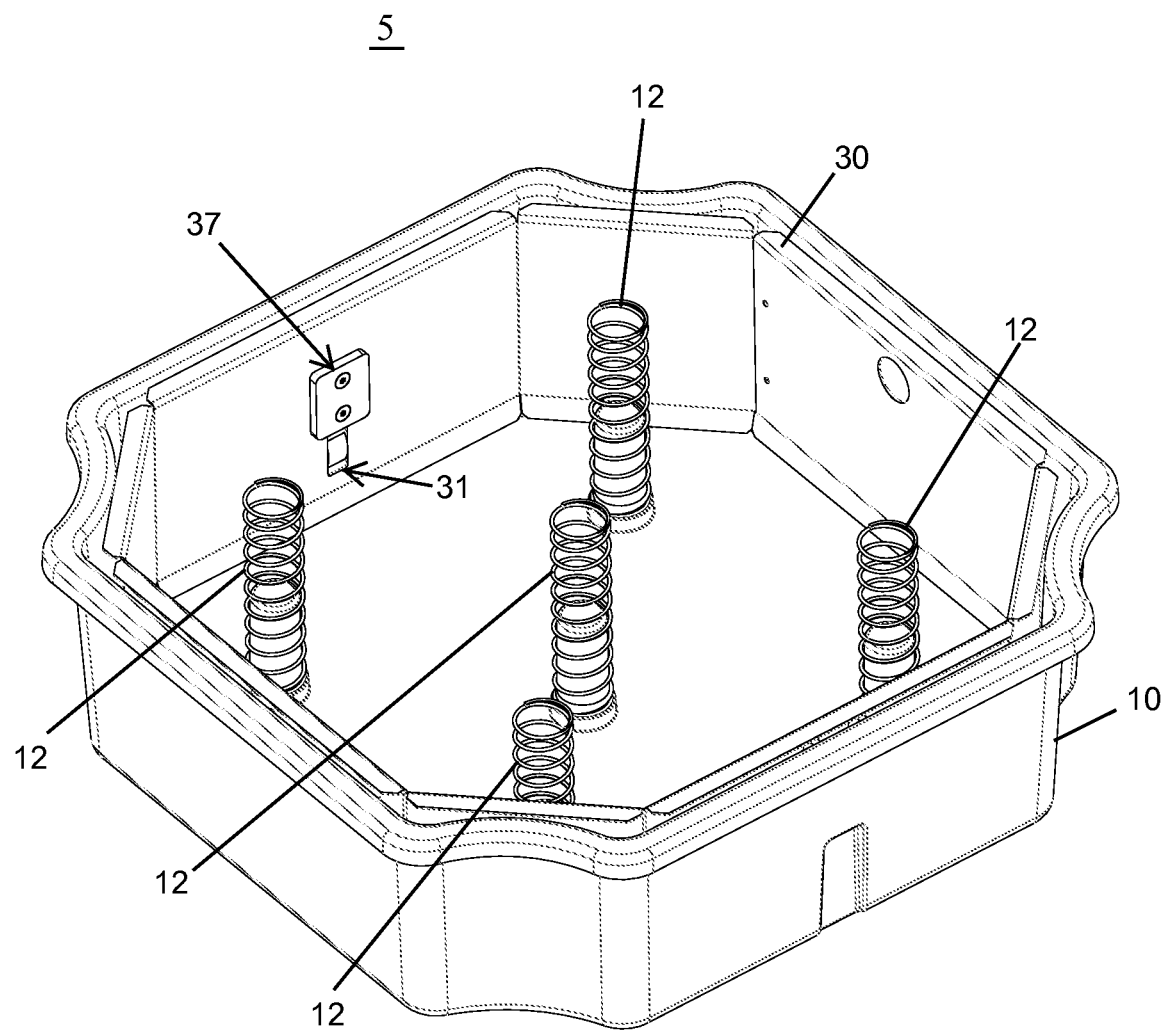

FIGS. 6 and 7 illustrate isometric views of the cooling tray without the platform according to a first embodiment of the present invention. FIG. 6 illustrates the skirt 30 in the up position, while FIG. 7 illustrates the skirt 30 in the down position. In both FIGS. 6 and 7, the platform 20 is removed to allow a clearer view of the skirt 30 as coupled to the inside walls of the container 10. The skirt 30 includes a plurality of slots 31 within which the latch assemblies 37 reside. As the skirt 30 moves between the up and down positions, the skirt 30 slides while the latch assemblies 37 reside within the slots 31. The slots 31 have a size and length which allows the desired extension beyond the upper lip of the container 10 when in the full up position, and which allows the skirt 10 to be fully disengaged as a temporary container when in its full down position.

Figure 8:
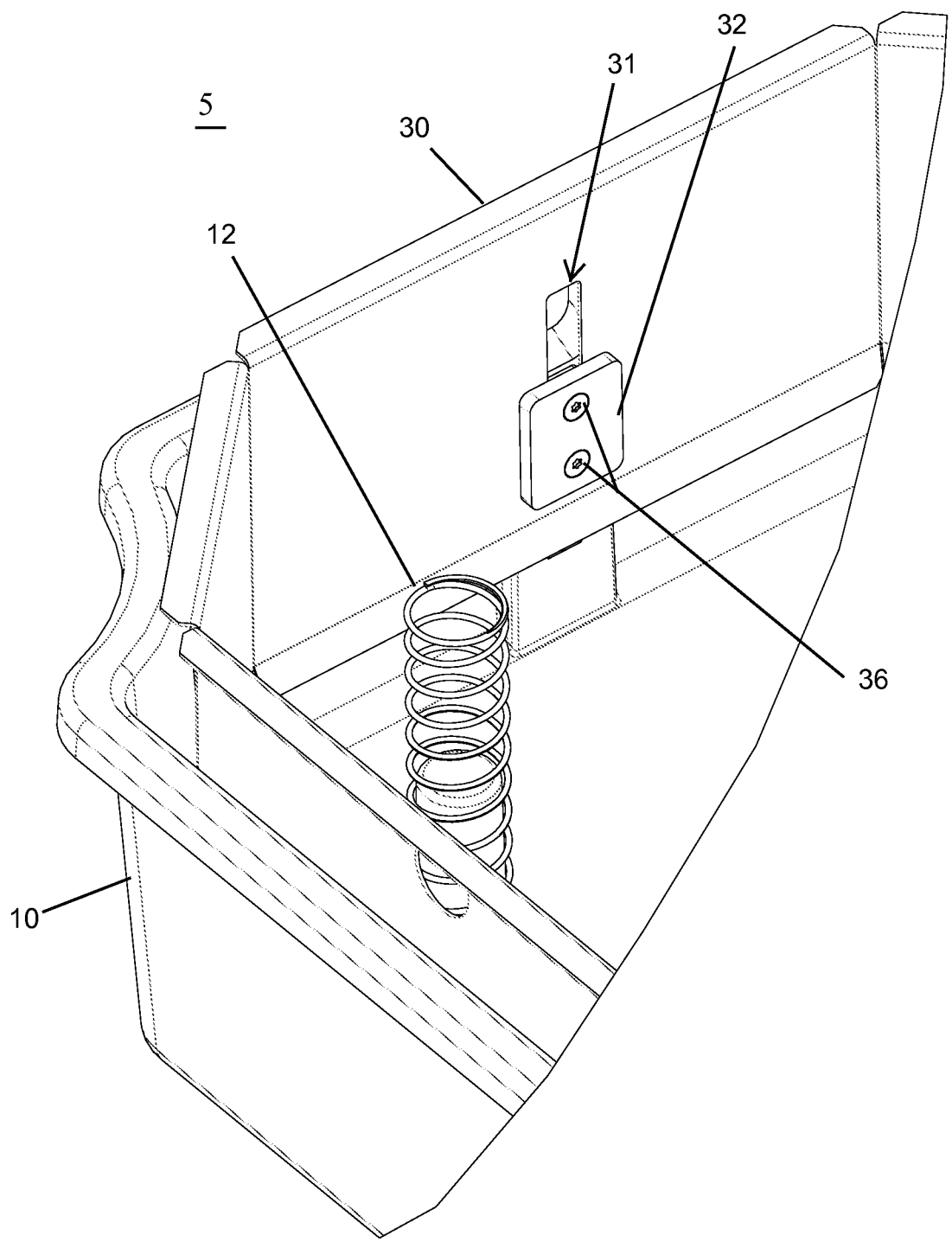
FIG. 8 illustrates a close-up view of a latch assembly, coupling the skirt to the container, with the skirt in the up position, according to the first embodiment of the present invention.
Figure 9:
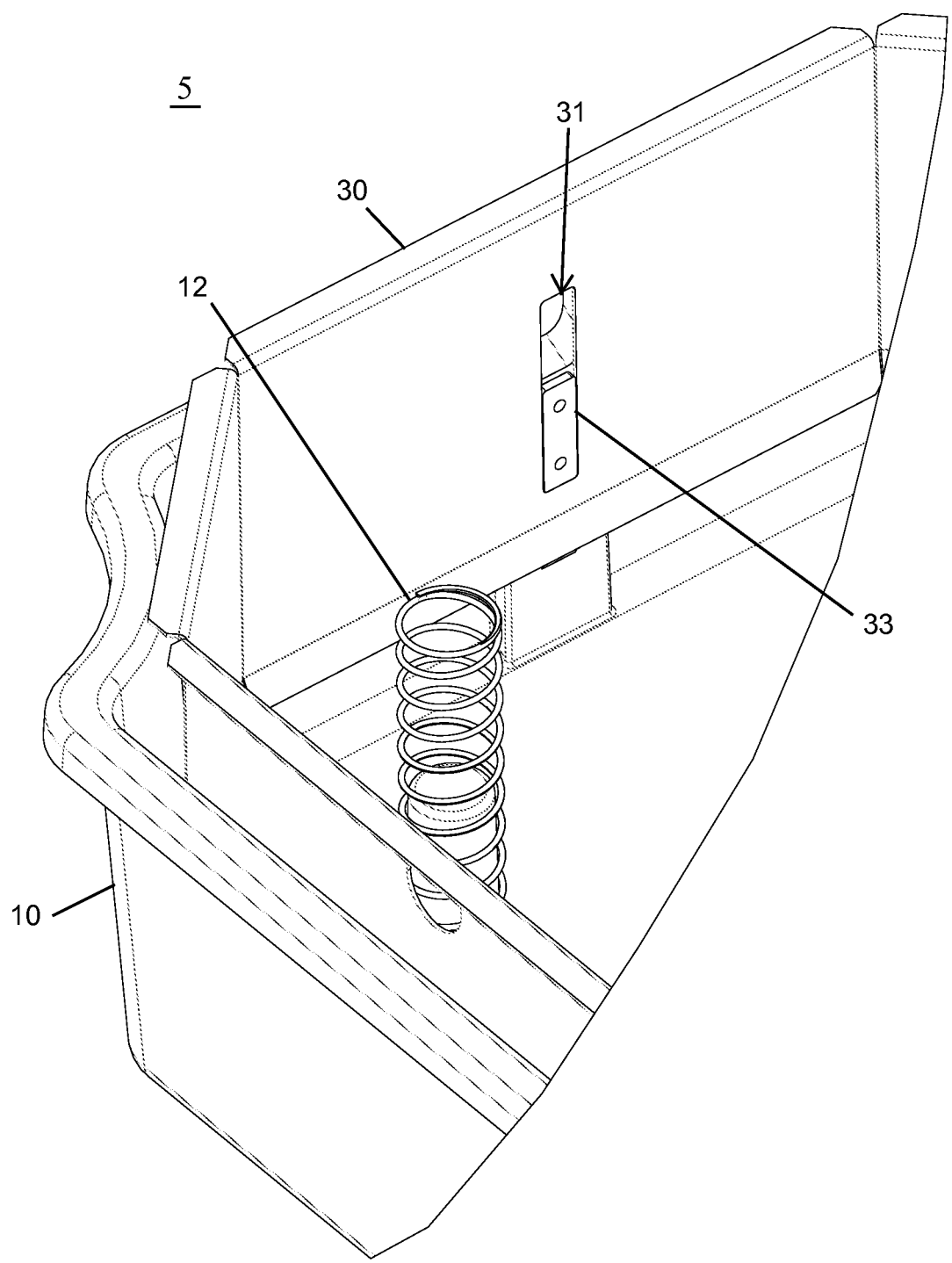
FIGS. 9 and 10 illustrate close-up views of the latch assembly without the latch plate according to a first embodiment of the present invention.
Figure 10:
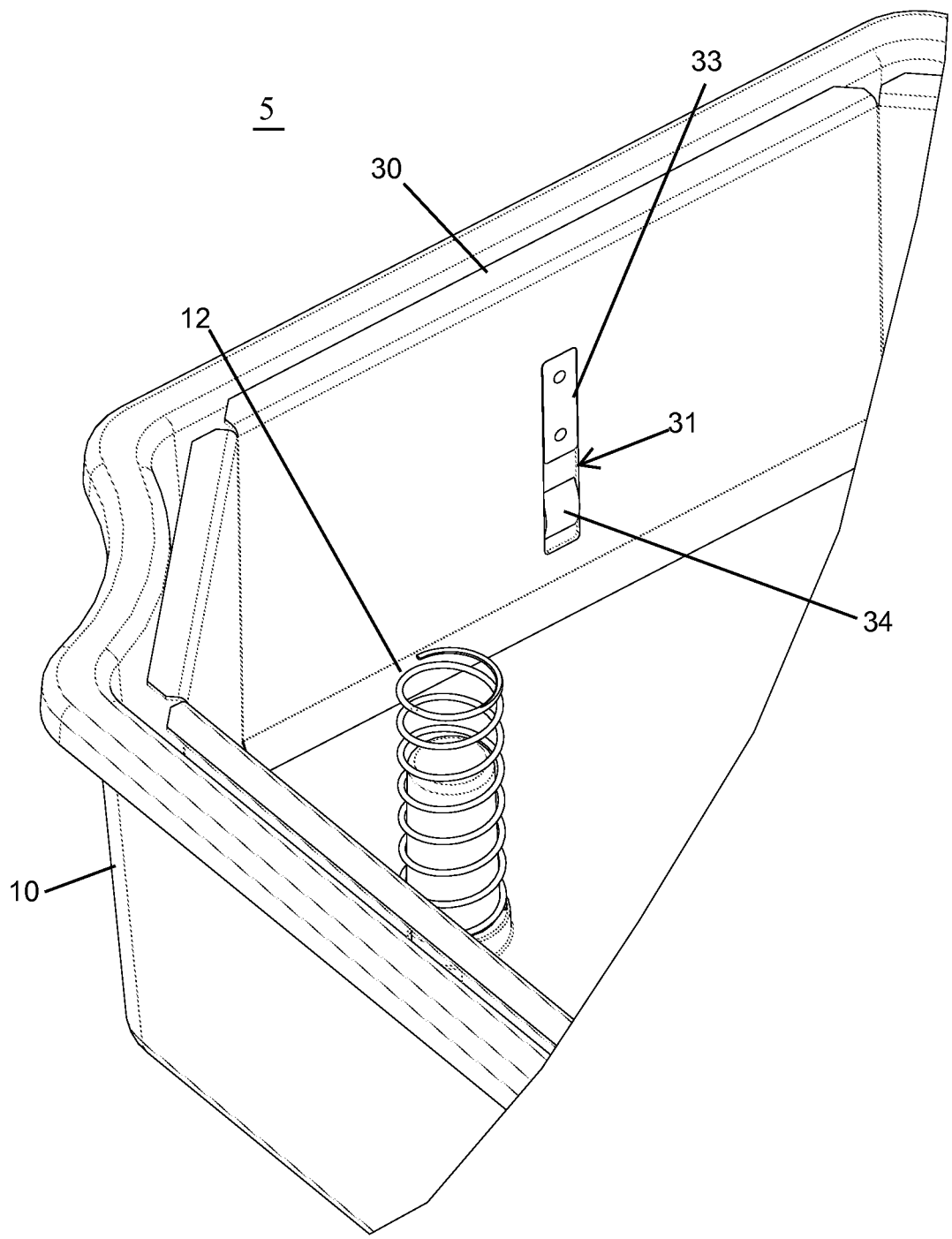

FIG. 8 illustrates a close-up view of a latch assembly 37, coupling the skirt 30 to the container 10, with the skirt in the up position, according to the first embodiment of the present invention. Each latch assembly 37 includes a latch plate 32 and screws 36 coupling the latch plate 32 to a latch (hidden) in the wall of the container 10. FIGS. 9 and 10 illustrate close-up views of the latch assembly without the latch plate according to a first embodiment of the present invention. In the close-up view of FIG. 9, the platform 20 and latch plate 32 are removed to show the latch 33 as it resides within a slot 31 of the skirt 30. FIG. 9 illustrates the latch 33 with the skirt 30 in the up position, while FIG. 10 illustrates the latch 33 with the skirt 30 in the down position. When the skirt 30 is in the down position, a bump 34 on the inside wall of the container 10 resides within the slot 31, as described further below. In this embodiment, the latch 33 and the bump 34 are formed as part of the container 10 but may be separate pieces coupled to the inside wall of the container 10.

Figure 11:
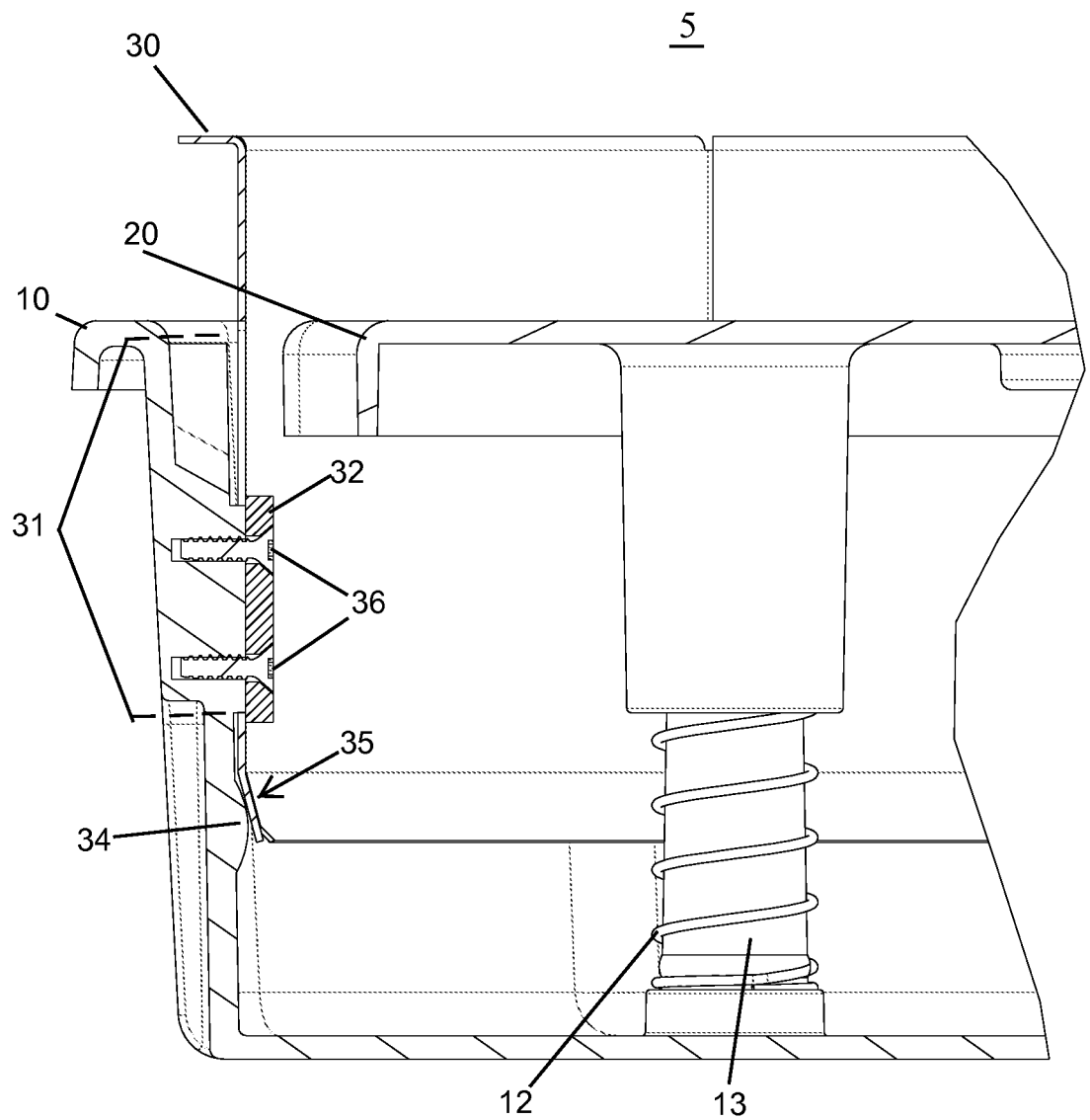
FIGS. 11 and 12 illustrate close-up cross-sectional views of the latch assembly, coupling the skirt to the container, according to the first embodiment of the present invention.
Figure 12:
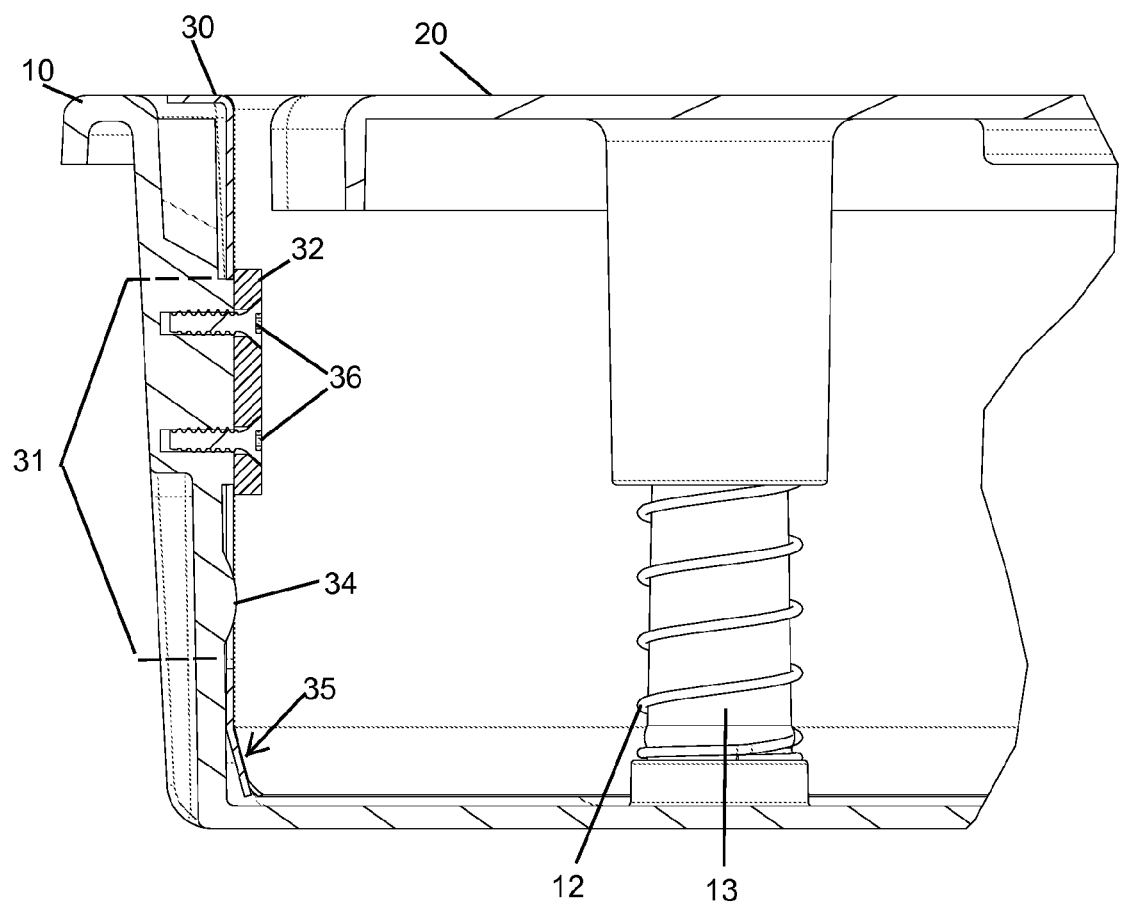

FIGS. 11 and 12 illustrate close-up cross-sectional views of the latch assembly, coupling the skirt to the container, according to the first embodiment of the present invention. FIG. 11 illustrates the latch assembly with the skirt 30 in the up position, while FIG. 12 illustrates the latch assembly 37 with the skirt 30 in the down position. The inside wall of the container 10 further includes a bump 34, and the bottom portion of the skirt 30 includes an angled portion 35. As illustrated in FIG. 11, when in the up position, the angled portion 35 engages the bump 34 as shown, maintaining the skirt 30 in the up position. The skirt 30 has been moved upward, so the latch plate 32 is located near the bottom of the slot 31. As illustrated in FIG. 12, the skirt 30 may be pushed downward such that the angled portion 35 is able to move over and clear the bump 34. When the skirt 30 is in the down position, the bump 34 resides within the slot 31 (see also FIG. 10). The latch plate 32 is located near the top of the slot 31. In both FIGS. 11 and 12, the platform 20 is shown in the up position.

Figure 13:
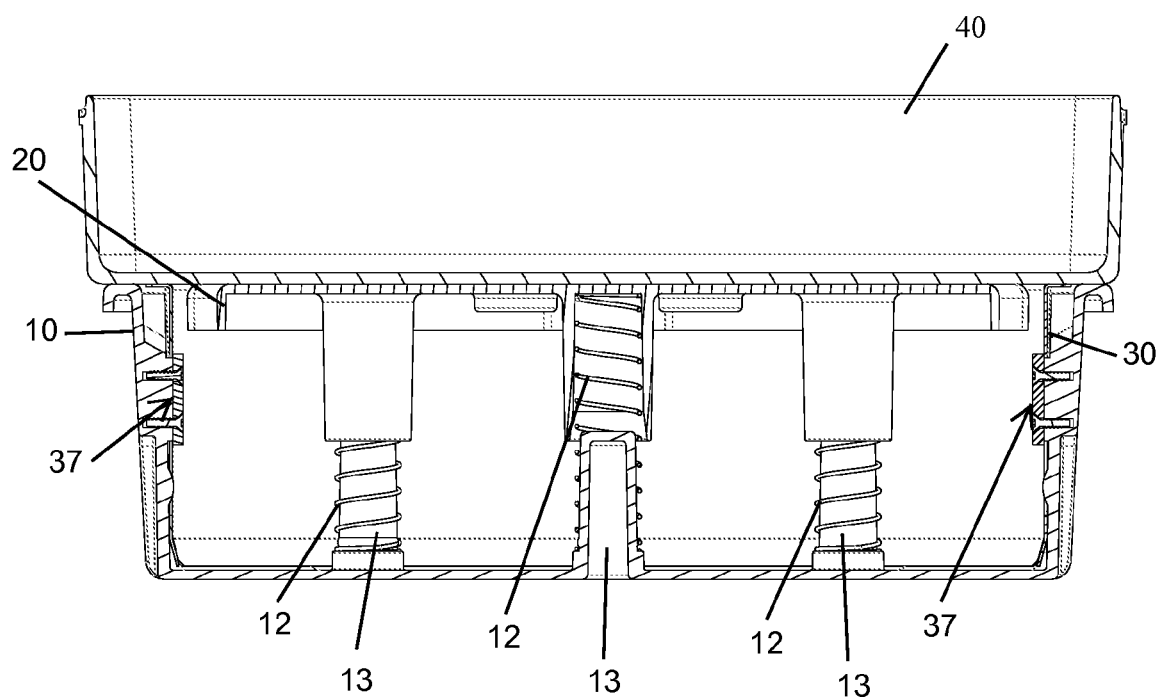
FIG. 13 illustrates a cross-sectional view of the cooling tray with the bowl according to the first embodiment of the present invention.

FIG. 13 illustrates a cross-sectional view of the cooling tray with the bowl according to the first embodiment of the present invention. The skirt 30 is illustrated in its full down position. With the skirt 30 in this position, the lip of the skirt 30 is flush or below the lip of the container 10, such that when the bowl 40 is placed on the ice, there is no hindrance from the skirt 30. When the springs 12 are fully decompressed, the platform 20 is maintained against the undersurface of the bowl 40. When ice (not shown) has been placed on the platform 20, the bowl's undersurface contacts the ice, cooling the bowl 40. Food placed within the bowl 40 is also cooled, with the sidewalls and an optional lid (not shown) of the bowl 40 assists in maintaining the food cool. As the ice melts, and the water flows below the platform 20, the weight of the ice decreases and decompresses the springs 12, keeping the ice in contact with the undersurface of the bowl 40.

FIGS. 14-19 illustrate a second embodiment of the cooling tray according to the present invention.

Figure 14:
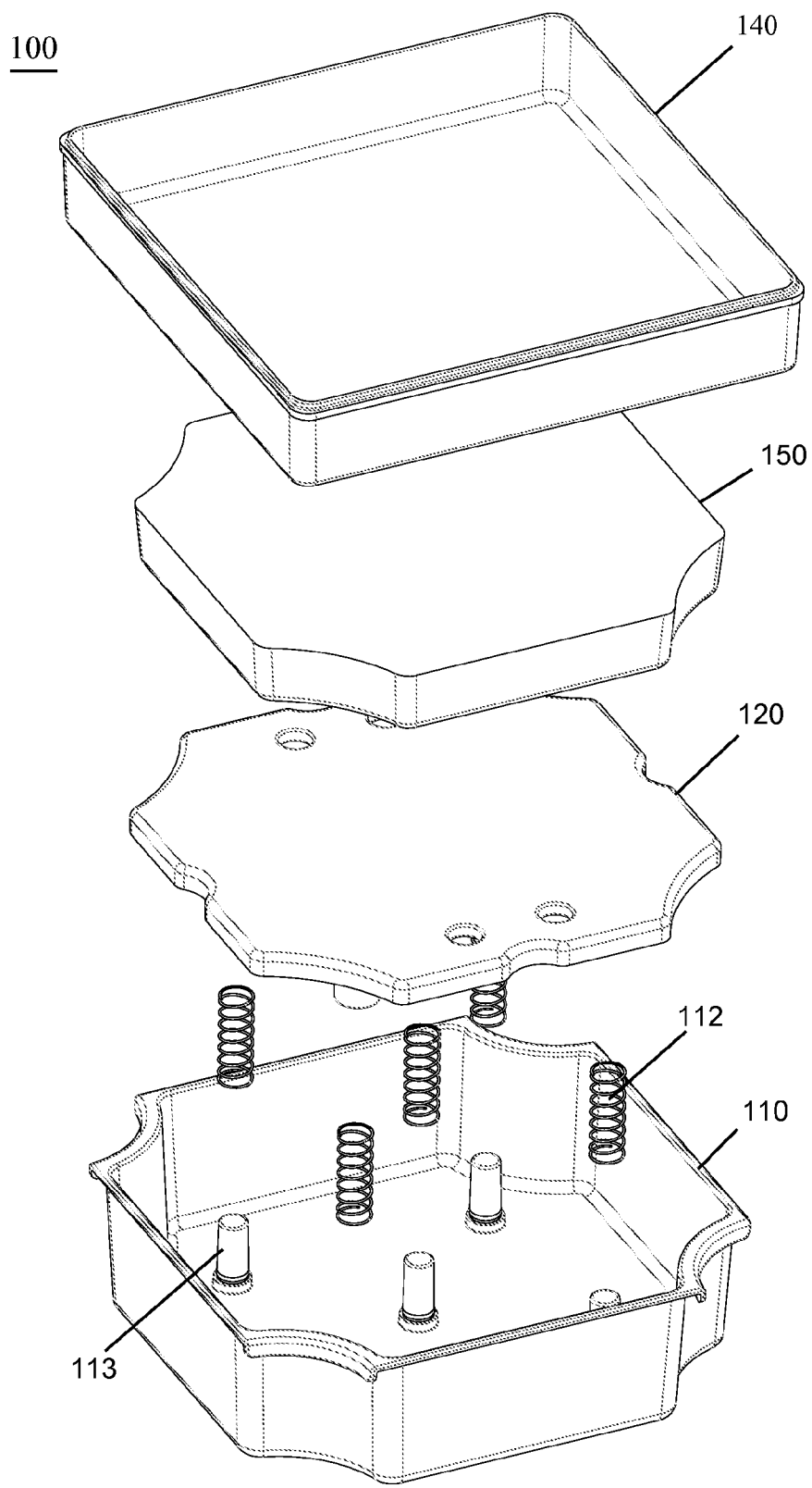
FIG. 14 illustrates an exploded view of the cooling tray according to a second embodiment of the present invention.

FIG. 14 illustrates an exploded view of the cooling tray according to a second embodiment of the present invention. The cooling tray 100 comprises a container 110, a platform 120, and a bowl 140 with sidewalls. A plurality of springs 112 are placed upon a plurality of pegs 113 coupled to the container 110 to exert an upward thrust. In contrast to the cooling tray 5 of the first embodiment, this cooling tray 100 does not have a skirt. Instead, the cooling tray 100 uses a formed ice block 150. In this embodiment, the formed ice block 150 is of a shape and size that it can reside snuggly within the container 110 and on the platform 120. With the use of the formed ice block 150, no skirt is required to facilitate the loading of ice. When the formed ice block 150 is placed on top of the platform 120, the weight of the formed ice block 150 compresses the springs 112, lowering the platform 120. When the bowl 140 is placed on the formed ice block 150, the bowl's undersurface contacts the formed ice block 150, cooling the bowl 140. Food placed within the bowl 140 is also cooled, with the sidewalls and an optional lid (not shown) of the bowl 140 assists in maintaining the food cool. No food is placed in the container 110 or directly on the formed ice block 150. As the formed ice block 150 melts, and the water flows below the platform 120 around the side edges of the platform 120, the weight of the formed ice block 150 decreases and decompresses the springs 112, keeping the formed ice block 150 in contact with the undersurface of the bowl 140. In this embodiment, the bowl 140 is composed of aluminum, which optionally may have a coating for increased durability of the bowl 140 and food safety. However, other materials and/or coatings may be used without departing from the spirit and scope of the present invention.

Figure 15:
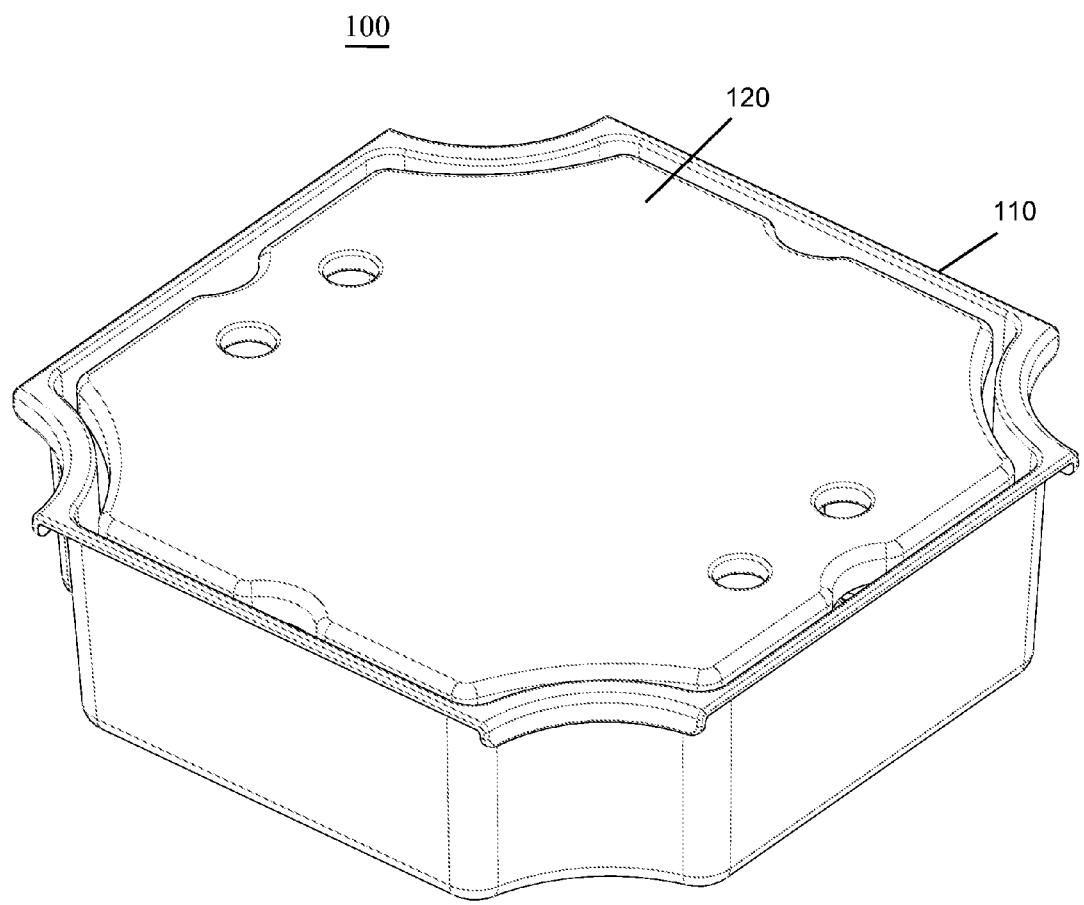
FIG. 15 illustrates an isometric view of the cooling tray according to the second embodiment of the present invention.

FIG. 15 illustrates an isometric view of the cooling tray according to the second embodiment of the present invention. As illustrated, the cooling tray 100 comprises the container 110 and the platform 120, but does not have a skirt.

Figure 16:
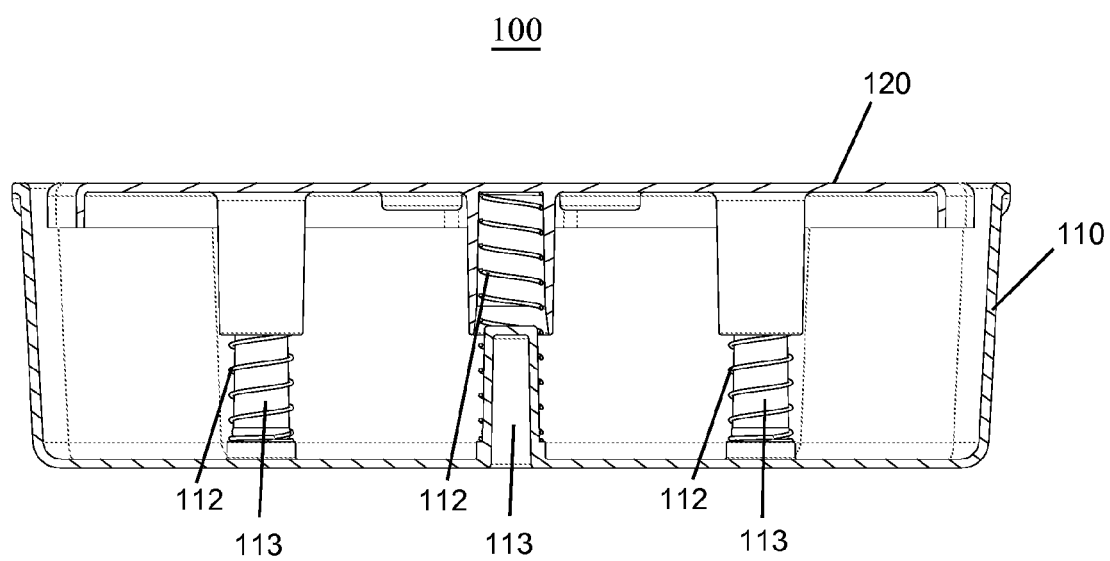
FIGS. 16 and 17 illustrate cross-sectional views of the cooling tray, without the formed ice block or bowl, according to the second embodiment of the present invention.
Figure 17:
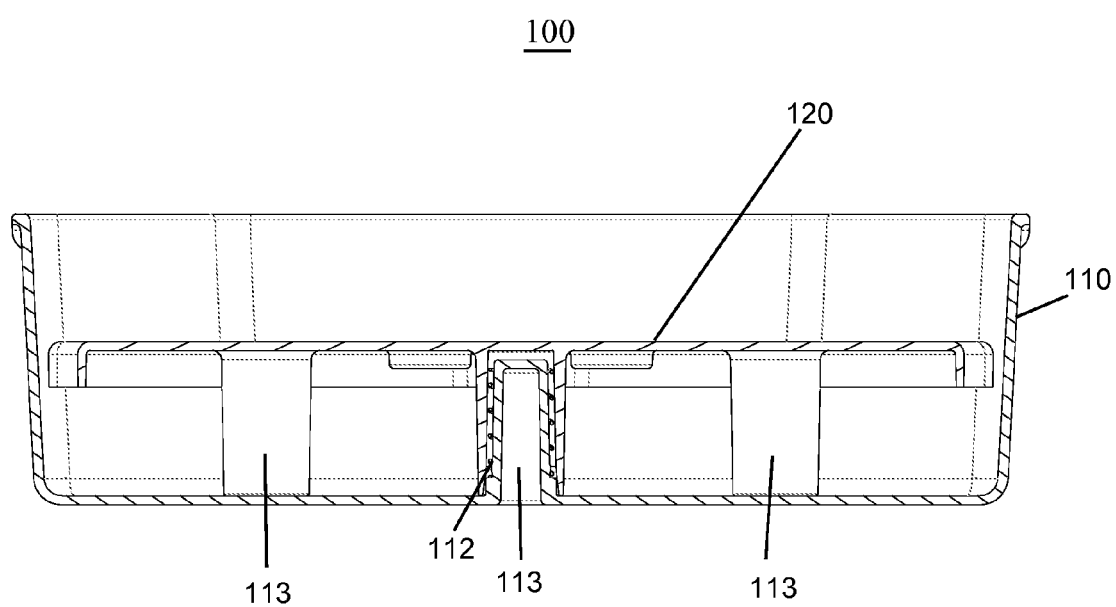

FIGS. 16 and 17 illustrate cross-sectional views of the cooling tray, without the formed ice block or bowl, according to the second embodiment of the present invention. FIG. 16 illustrates the platform 120 in the up position, while FIG. 17 illustrates the platform 120 in the down position. As illustrated in FIG. 16, when the springs 112 residing on the pegs 113 are fully decompressed, the platform 120 in its full up position. As illustrated in FIG. 17, when the springs 112 are fully compressed, the platform 120 is in its full down position.

Figure 18:
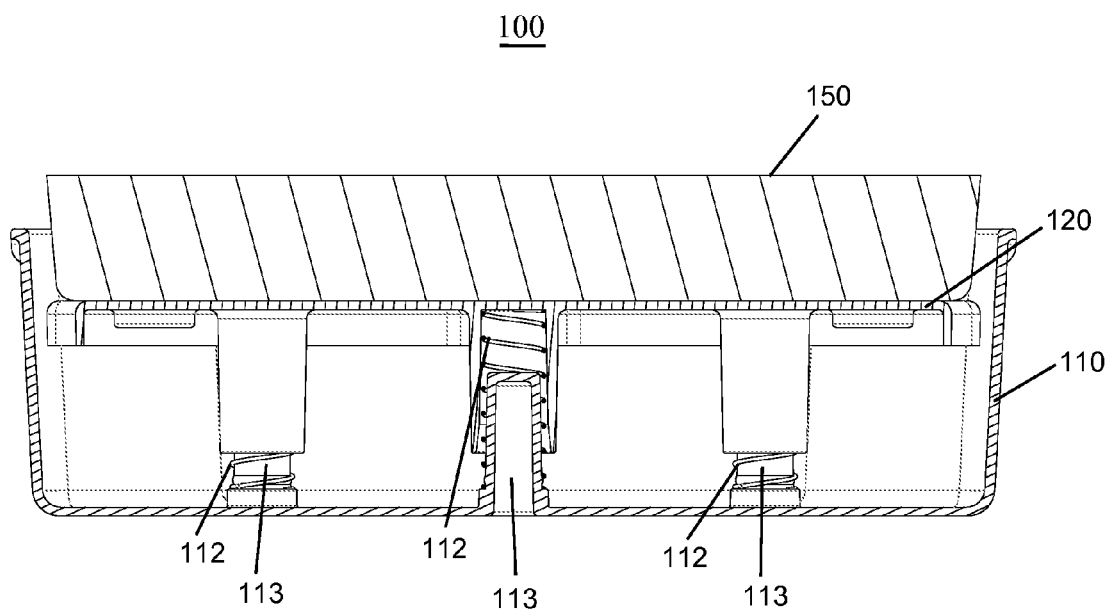
FIGS. 18 and 19 illustrate cross-section views of the cooling tray, with the formed ice block, according to the second embodiment of the present invention.
Figure 19:
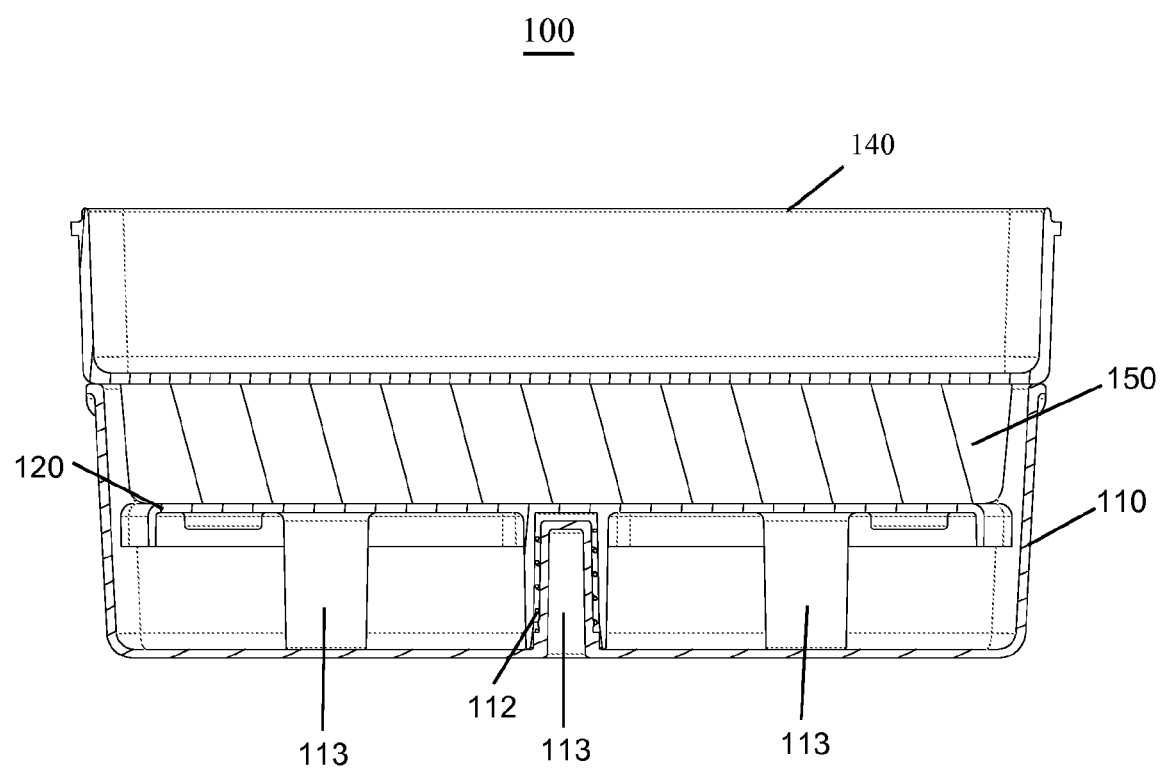

FIGS. 18 and 19 illustrate cross-section views of the cooling tray, with the formed ice block, according to the second embodiment of the present invention. As illustrated in FIG. 18, when the formed ice block 150 is placed on top of the platform 120, its weight compresses the springs 112, moving the platform 120 toward its down position. As illustrated in FIG. 19, the bowl 140 may then be placed on the formed ice block 150. The placement of the bowl 140 on the formed ice block 150 will further compress the springs 112, such that the formed ice block 150 contacts the undersurface of the bowl 140. The platform 120 is thus in its full down position. As the formed ice block 150 melts, and the water flows below the platform 120, the weight of the formed ice block 150 decreases and decompresses the springs 112, keeping the formed ice block 150 in contact with the undersurface of the bowl 140. A mold (not shown) may be used to create formed ice block of the appropriate shape and size for use with the cooling tray. Multiples of these molds may be used to create multiple ice blocks. As one ice block melts, another ice block may replace it.

FIGS. 20-25 illustrate a cooling tray according to a third embodiment of the present invention.

Figure 20:
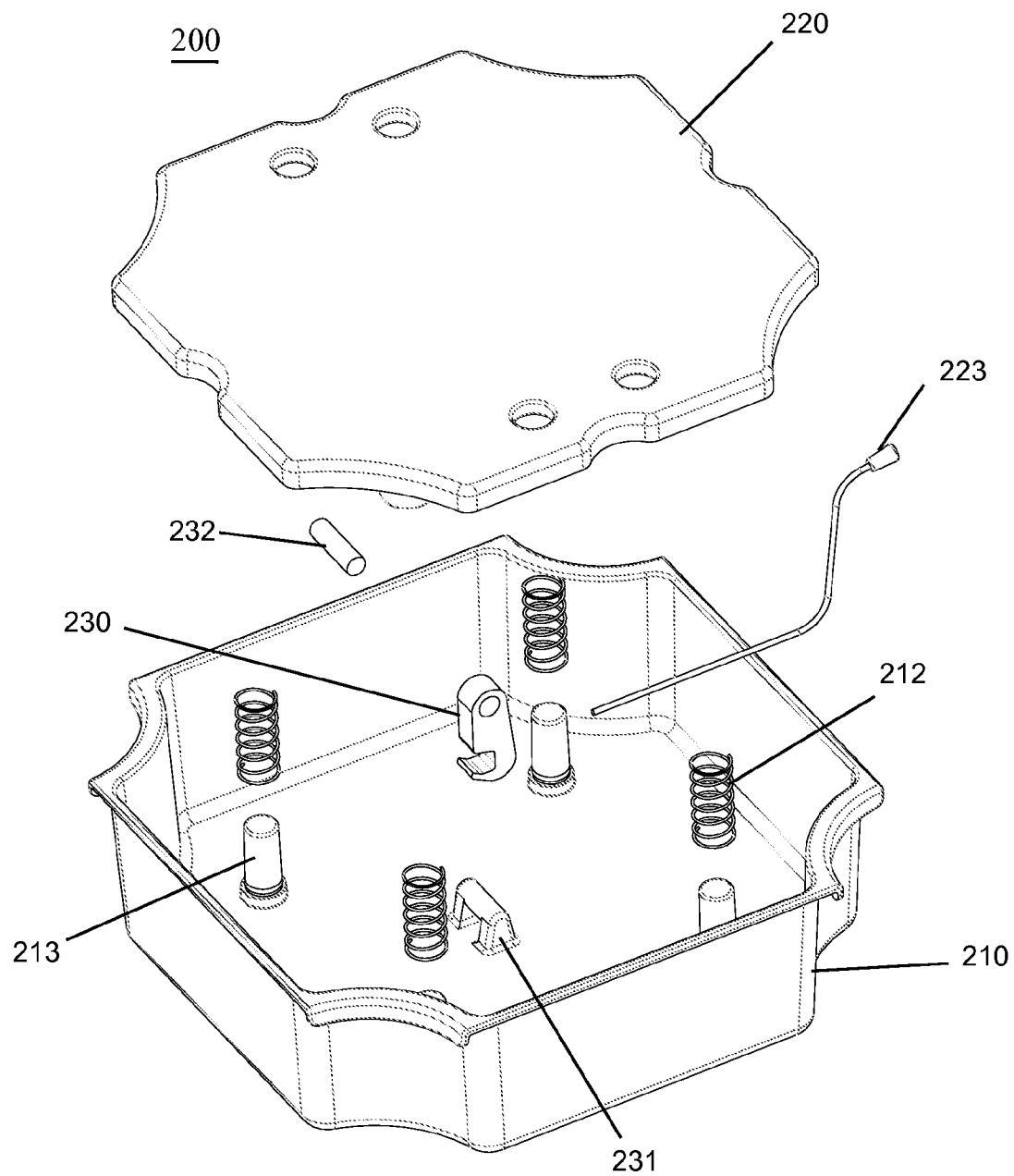
FIG. 20 illustrates an exploded view of the cooling tray according to the third embodiment of the present invention.

FIG. 20 illustrates an exploded view of the cooling tray according to the third embodiment of the present invention. The cooling tray 200 comprises a container 210, a platform 220, and a bowl with sidewalls (not shown). A plurality of springs 212 are placed upon a plurality of pegs 213 coupled to the container 210 to exert an upward thrust. The cooling tray 200 includes a locking mechanism for locking the platform 220 in a down position. The locking mechanism includes a hook 230 coupled to a hook attachment (hidden) of the platform 220 via a dowel 232. The dowel 232 acts as a pivot point for the hook 230. The container 210 includes a bracket 231 with which the hook 230 may engage. When the hook 230 is engaged with the bracket 231, the platform 220 is locked in the down position. The hook 230 is disengaged from the bracket 231 through a release lever 233 coupled to the hook 230. When the release level 233 is pulled, the hook 230 pivots at the dowel 232 location, and the hook is disengaged from the bracket 231. In this embodiment, the bottom surface of the hook 230 and the top surface of the bracket 231 are rounded. The platform 220 may be locked by being pressed upon at its top surface. As the rounded bottom of the hook 230 contacts the rounded top of the bracket 231, the continual pressing of the platform 220 upon its top surface causes the hook 230 to pivot at the dowel location 232 until the bottom of the hook 230 clears the top of the bracket 231. This causes the hook 230 to fully engage the bracket 231, locking the platform 220 in its down position. Once the platform 220 is locked in its down position, ice may then be placed onto the top surface of the platform 220. A bowl (not shown) may then be placed on the ice. Once the ice is loaded and the bowl is placed, the platform may be released using the release lever 233. The release of the platform allows the springs 212 to decompress, causing the bowl's undersurface to contact the ice, which cools the bowl. Food placed within the bowl is also cooled, with the sidewalls and an optional lid (not shown) of the bowl assists in maintaining the food cool. As the ice melts, the water flows below the platform 220 around the side edges of the platform 220, and the weight of the ice decreases and decompresses the springs 212, keeping the ice in contact with the undersurface of the bowl.

Figure 21:
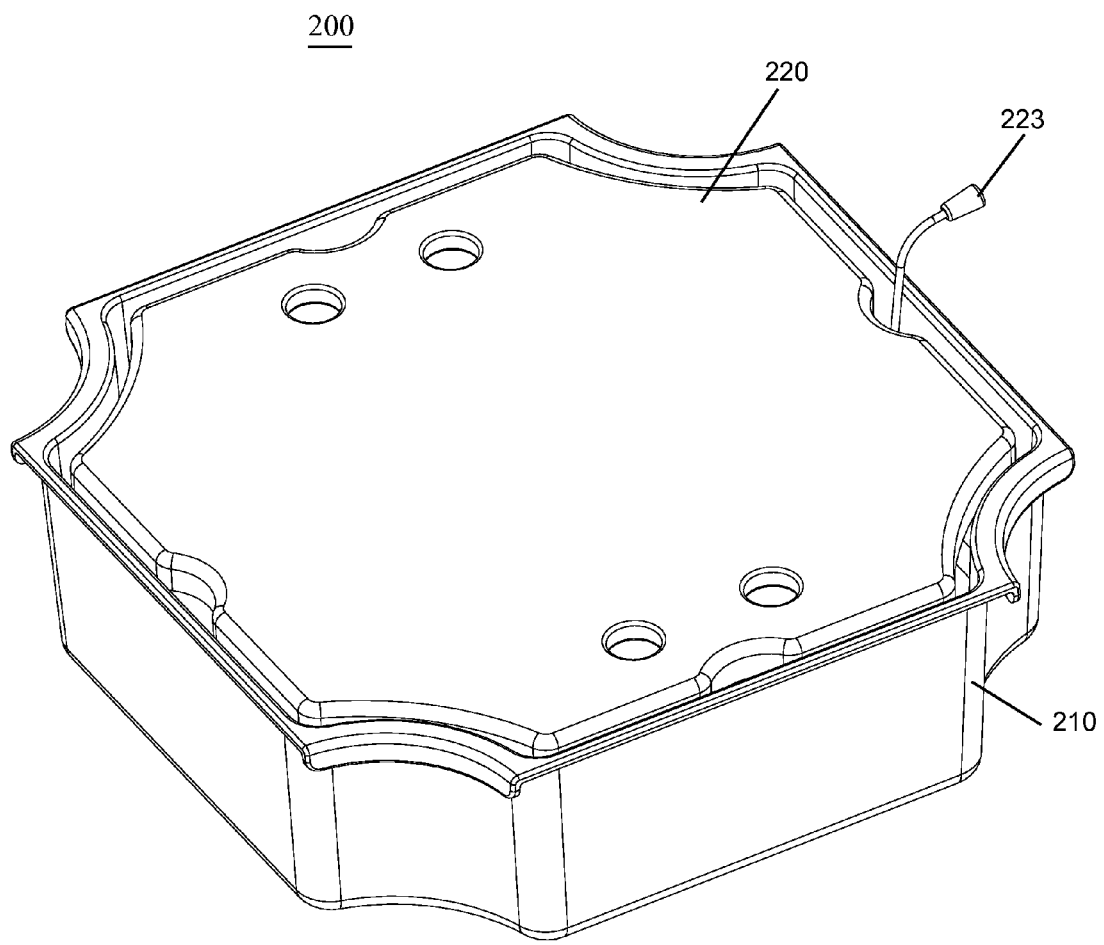
FIG. 21 illustrates an isometric view of the cooling tray according to the third embodiment of the present invention.

FIG. 21 illustrates an isometric view of the cooling tray according to the third embodiment of the present invention. The cooling tray 200 is illustrated with the platform 220 in the unlocked position. A portion of the release level 223 protrudes from the container 210 for easy access.

Figure 22:
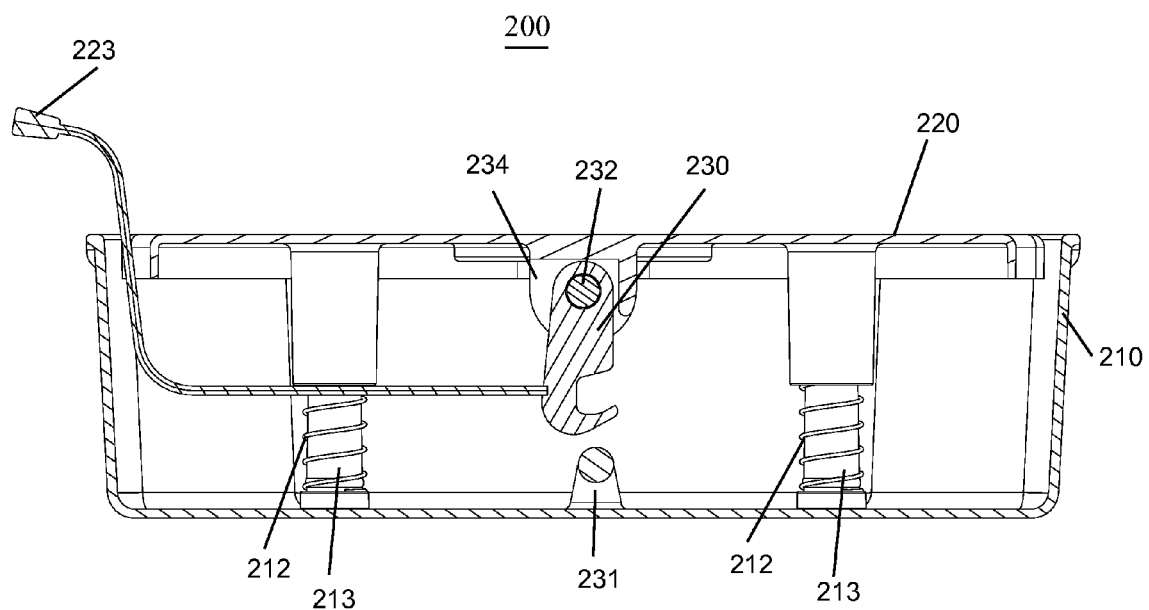
FIGS. 22 and 23 illustrate cross-sectional views of the cooling tray according to the third embodiment of the present invention.
Figure 23:
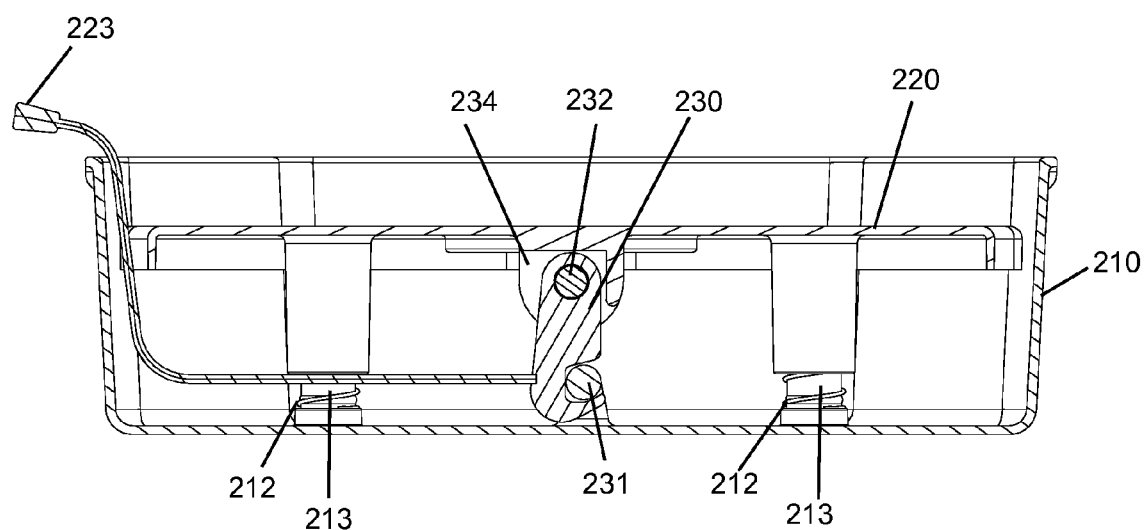

FIGS. 22 and 23 illustrate cross-sectional views of the cooling tray according to the third embodiment of the present invention. FIG. 22 illustrates the cooling tray 200 with the platform 220 in the unlocked position, while FIG. 23 illustrates the cooling tray 200 with the platform 220 in the locked position. As illustrated in FIG. 22, when the platform 220 is in the unlocked position, the springs 212, residing on the pegs 213 are decompressed, and the hook does not engage the bracket 231 coupled to the container 210. As illustrated in FIG. 23, when the platform 220 is in the locked position, the springs 212 are compressed, and the hook 230 engages the bracket 231.

Figure 24:
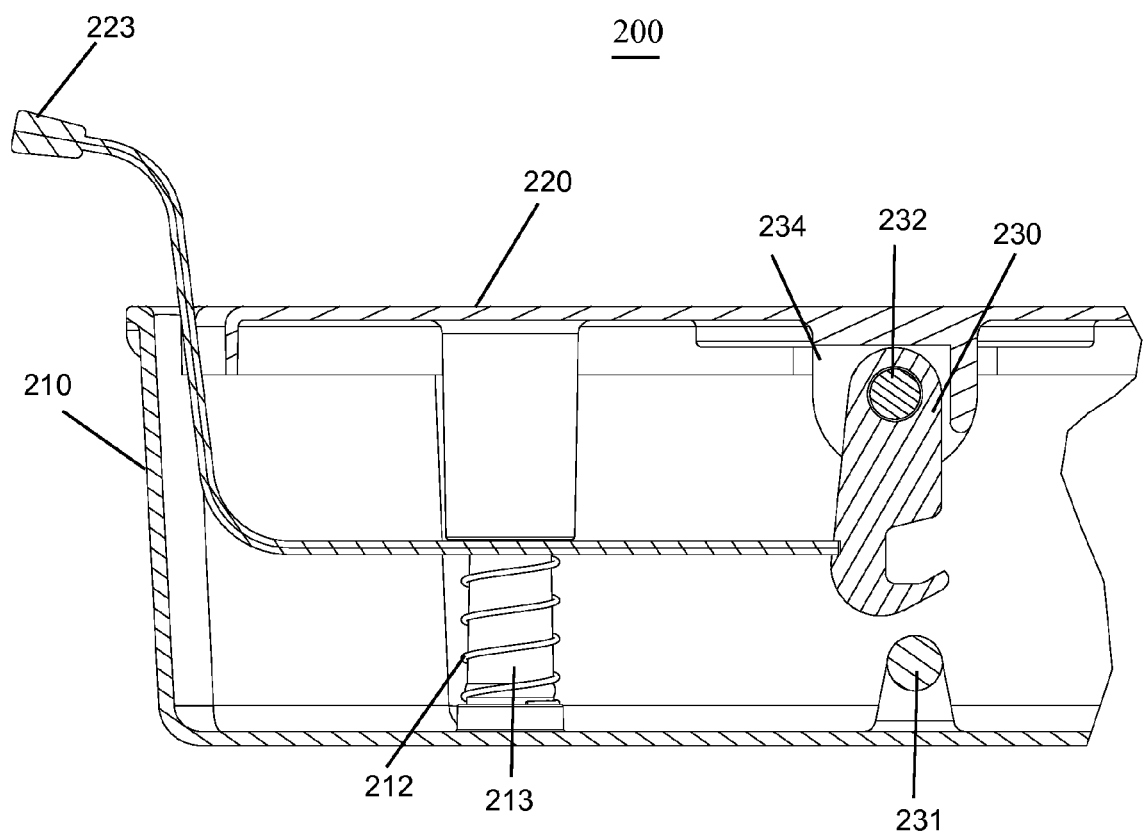
FIGS. 24 and 25 illustrate close-up cross-sectional views of the platform locking mechanism of the cooling tray according to the third embodiment of the present invention.
Figure 25:
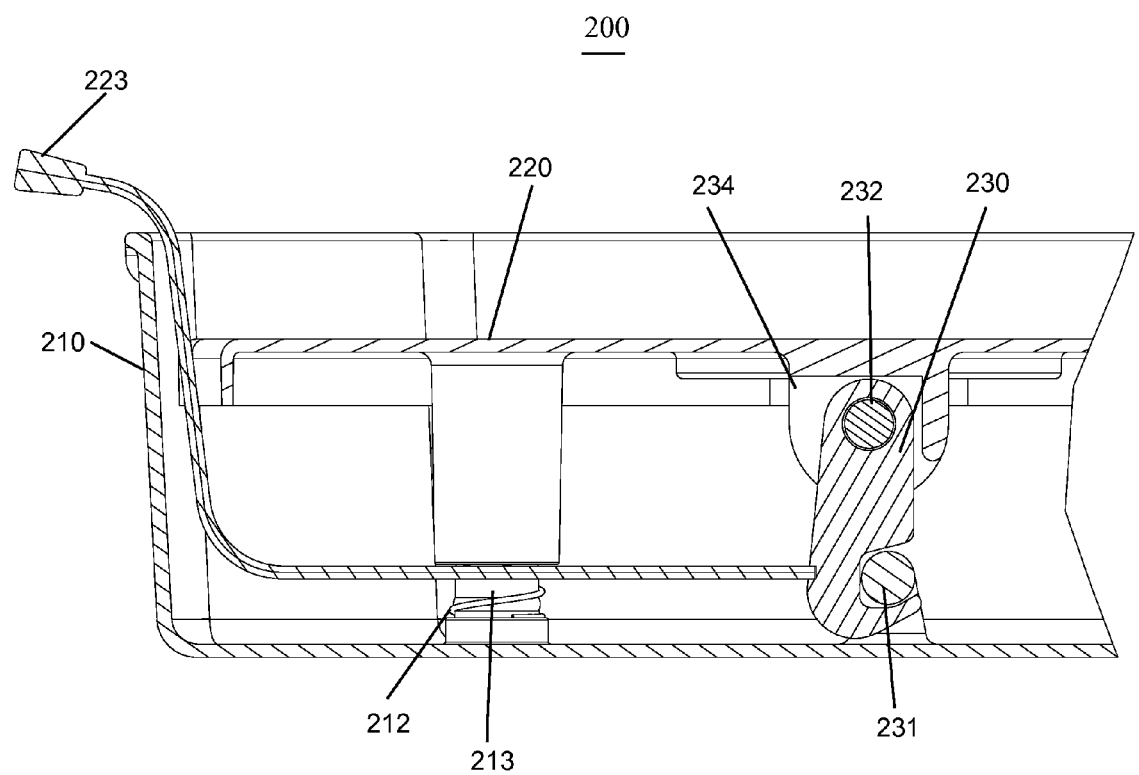

FIGS. 24 and 25 illustrate close-up cross-sectional views of the platform locking mechanism of the cooling tray according to the third embodiment of the present invention. FIG. 24 illustrates the locking mechanism with the platform 220 in the unlocked position, while FIG. 25 illustrates the locking mechanism with the platform 220 in the locked position. As illustrated in FIG. 24, when the platform 220 is in the unlocked position, the hook 230 does not engage the bracket 231 coupled to the container 210. As illustrated in FIG. 25, when the platform is in the locked position, the hook 230 engages the bracket 231. To release the hook 230 from the bracket 231 in order to return the platform 220 to its unlocked position, the release lever 223 is pulled such that the hook 230 pivots at the dowel 232 location until it disengaged from the bracket 231.

Once the platform 220 is locked in its down position, ice may then be placed onto the top surface of the platform 220. A bowl (not shown) is then placed on the ice, and the release level 223 may then be pulled to release the hook 230, returning the platform to its unlocked position. The springs 212 will then decompress, and the ice on the surface of the platform 220 will contact the undersurface of the bowl. As the ice melts, and the water flows below the platform 220, the weight of the ice decreases and decompresses the springs 212 further, keeping the ice in contact with the undersurface of the bowl.

Although the embodiments of the present invention are described above with springs, other mechanisms for exerting an upward thrust may be used without departing from the spirit and scope of the present invention. For example, gas springs, counterweights with a lever, an electric solenoid, etc. may be used.

With the embodiments of the present invention, food that requires refrigeration may be served from the portable cooling tray at the appropriate temperature without requiring electricity. Further, with the second embodiment of the cooling tray 100, use of a formed ice block 150 imparts greater and more efficient cooling than ice chips or cubes as a greater surface area of the ice contacts the undersurface of the bowl 140. The use of aluminum as the material for the bowl 140 further increases the efficiency. The food within the bowl 140 may be maintained at the desired temperature for longer periods of time. Significantly, the cooling tray 100 is able to maintain food within the bowl 140 at the 40° F. required by FDA regulations. Although the embodiments above are described with the use of ice, other cooling materials may be used without departing from the spirit and scope of the present invention.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A cooling tray, comprising:
    a container;
    a plurality of springs placed within the container to exert an upward thrust and each coupled to the container at a first end;
    a platform residing within the container and coupled to each spring at a second end;
    a bowl for residing above the container,
    wherein when a cooling material is placed on the platform, the plurality of springs are each compressed such that the cooling material contacts an undersurface of the bowl;
    a skirt coupled to inside walls of the container, wherein the skirt surrounds the platform and is not coupled to the platform, the skirt comprising a plurality of slots in one or more vertical walls of the skirt; and
    a plurality of latch assemblies coupled to inside walls of the container and residing within the plurality of slots,
    wherein the skirt is moveable in a vertical direction along the latch assemblies residing in the slots.

2. The cooling tray of claim 1,
    wherein as the cooling material melts, the melted cooling material flows below the platform, wherein the plurality of springs each decompresses and maintains the remaining cooling material in contact with the undersurface of the bowl.

3. The cooling tray of claim 2, wherein the cooling material comprises a formed ice block comprising a shape and size to fit onto the platform and within the container.

4. The cooling tray of claim 1, further comprising a locking mechanism comprising:
    a hook coupled to an undersurface of the platform; and
    a bracket coupled to the container,
    wherein the hook engages the bracket to place the platform in a locked position.

5. The cooling tray of claim 4, wherein the locking mechanism further comprises:
    a release lever coupled to the hook, wherein engagement of the release lever disengaged the hook from the bracket, placing the platform in an unlocked position.

6. The cooling tray of claim 1, wherein while the skirt is in an up position, an upper lip of the skirt is beyond the upper lip of the container,
    wherein while the skirt is in a down position, the upper lip of the skirt is flush with the upper lip of the container.

7. The cooling tray of claim 1, wherein the inside walls of the container further comprises a bump, wherein the skirt further comprises an angled portion,
    wherein when the angled portion of the skirt engages the bump, the skirt is maintained at an up position.

* * * * *